April 23, 1940.
D. ROBERTS ET AL
2,197,839
EXPANDED RUBBER BOAT FENDER
Filed July 9, 1937
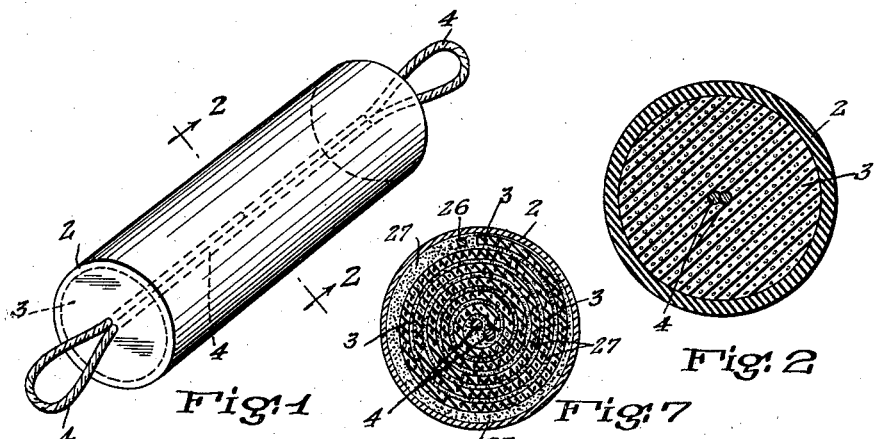
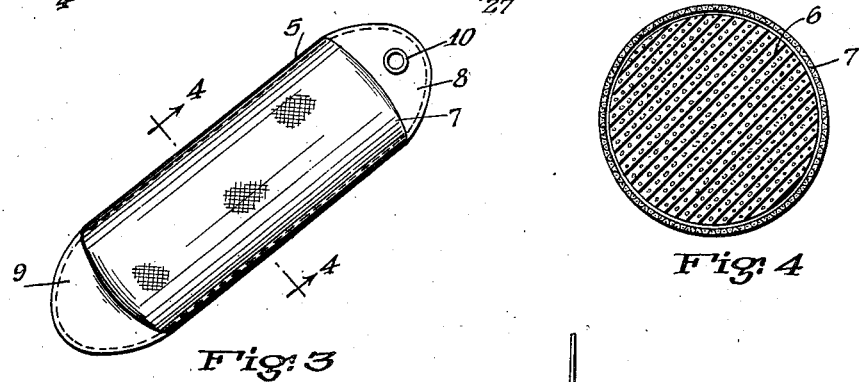
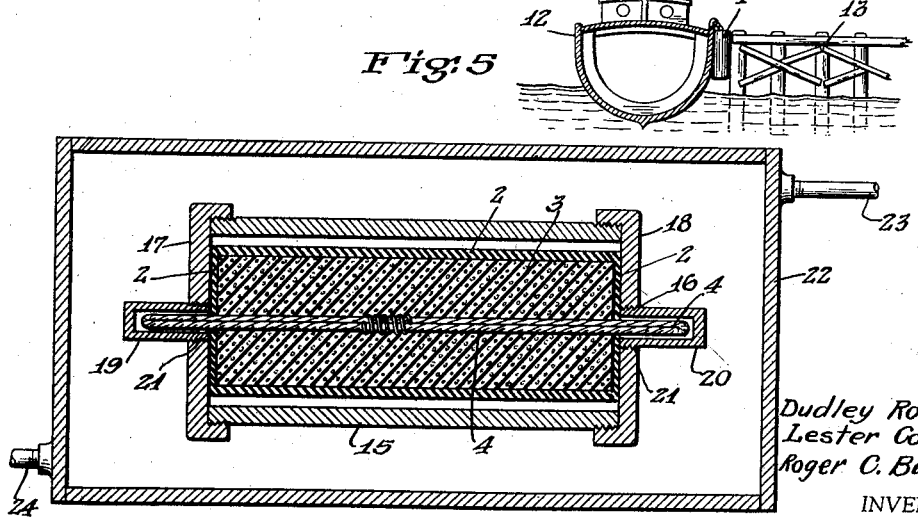
Dudley Roberts
Lester Cooper
Roger C. Bascom
INVENTORS.
BY Samuel Ostrolenk
ATTORNEY.

Patented Apr. 23, 1940

2,197,839

UNITED STATES PATENT OFFICE 2,197,839

EXPANDED RUBBER BOAT FENDER

Dudley Roberts, New York, Lester Cooper, Flushing, and Roger Charles Bascom, Merrick, N. Y., assignors to Rubatex Products, Inc., New York, N. Y., a corporation of Delaware Application July 9, 1937, Serial No. 152,686

4 Claims. (Cl. 114—219)

Our invention relates to a novel non-sinkable boat fender, or bumper and more specifically to a boat fender comprised of gas expanded rubber surrounded by a sheath of ungassed rubber, both being vulcanized together with a rope extending centrally therethrough, the ends of the rope forming loops or other fastening means.

The boat fenders of the prior art have been found lacking in many desirable characteristics. Up to the present time they have been for the most part made of cork, woven rope, kapok, solid rubber, etc., none of which materials has the desired resiliency. A boat fender should really be a shock absorber; when a boat bumps against a dock it is necessary that the opposing forces be absorbed with the minimum vibration and distortion to both boat and dock. For this reason, a very resilient material for a boat fender is imperative for the best results.

Cork in fabric containers is largely used, but both the cork and canvas deteriorate and rot in the presence of moisture and therefore such a boat fender has a short life. This short life is accelerated when such fenders are used in salt water.

In addition to these disadvantages the boat fenders in the prior art were ordinarily non-floating. Thus, if accidentally dropped overboard they were often lost.

The boat fender or bumper of our invention comprises a core of resilient gas expanded rubber containing an infinite number of minute closed cells. Each cell is a closed spherical film of rubber with gas enclosed therein.

Within this expanded rubber is molded firmly in place a rope or other fastening means. Around the outside of the expanded rubber core is a sheath of comparatively thin ordinary tough vulcanized rubber to provide a durable covering. The boat fender of our invention is extremely resilient, far more so than the boat fenders of the prior art. It is waterproof and can neither absorb nor adsorb any water. Therefore, its weight is not materially increased upon its immersion in water and its composition is inherently resistant to water. The boat fender is extremely light and easy to handle. The expanded rubber which constitutes the major portion of the fender has a weight on the order of 7 pounds per cubic foot. This is a weight far below that of any other material of the prior art; for instance, hard solid rubber runs about 80 pounds per cubic foot.

The boat fender of our invention is inexpensive to manufacture, since a comparatively small amount of rubber is needed, the rubber being expanded by gas to fill a large volume.

Further the boat fender of our invention has a certain floating power so that upon its being dropped overboard it cannot sink below the surface of the water because of the small sealed cells of gas contained therein. This is a marked advantage since such bumpers of the prior art can easily be lost in the water.

The object of our invention is to provide a novel boat fender.

A further object of our invention is to produce an unsinkable boat fender.

A further object of our invention is to provide a boat fender comprised of resilient water-resistant material of unusually long life.

Another object of our invention is to provide a boat fender that is easy to handle and inexpensive.

Another object of our invention is to provide a boat fender comprised of gas expanded rubber sheathed in a jacket of durable ungassed rubber.

Figure 1 of the drawing relates to a perspective view of the boat fender of our invention.

Figure 2 is a plan cross-section along the line 2—2 of Figure 1.

Figure 3 is a perspective view of a modified form of a boat fender.

Figure 4 is a cross-section taken along the line 4—4 of Figure 3.

Figure 5 represents a perspective view of the boat fender in use between a boat and a dock.

Figure 6 represents a side cross-section of a mold in which the boat fender of our invention is molded.

Figure 7 shows a cross-section of a modified and improved form of our boat fender.

Referring now more specifically to the drawing, in Figures 1 and 2 we show a boat bumper 1 comprising a sheathing of plain ungassed rubber compound 2 surrounding a core of the expanded rubber 3, in which core of expanded rubber is set in fixed position during the manufacture of the unit, a rope or other fixing means 4.

Figures 3 and 4 show a modified boat fender 5 of our invention. A canvas tube 7 is completely filled with gas expanded rubber 6 by a process to be described hereinafter. The ends 8 and 9 of the canvas tube are closed as by stitching. A metal eyelet 10 is inserted in one end 8 of the boat fender 5 for utility.

In Figure 5 we have shown a boat 12 wharved at a dock 13. The boat bumper 1, of our invention, is positioned between the boat and the dock to prevent any injury to the side of the boat.

In Figure 6 we have shown an apparatus for producing the boat bumper of our invention. Assembled in proper superimposed relationship, as will be described more specifically hereinafter, are the rope 4, the expanded rubber 3, and the sheath of ordinary rubber 2. This assembly is placed into a mold 15 with the ends of the rope protruding through the openings 16. The mold 15 is engaged at its ends by the flanges 17 and 18 which can be affixed to the mold 15 by any ordinary means and which constitute the end pieces of the mold. Over the ends of the rope 4 which protrude through the openings 16 are placed protective coverings 19 and 20 which engage the side flanges 17 and 18 in thread engaged at 21, so that the rope will not be scorched or burnt in a subsequent heating step. This mold with the gassed rubber and other components in proper assembly placed therein, is then positioned within a heating chamber 22, the temperature of which is regulated by means of a pipe 23 and 24. The heating chamber 22 is sealed and the temperature raised, thus heating the mold and raising the temperature of the gassed rubber 3, causing it to expand and firmly composite with the rope 4 and sheath of rubber 2.

In Figure 7 we have shown a modified and improved form of making our boat fender. Around the rope 4 is wrapped a sheet of cell-tight gas expanded rubber 3 with an intermediate layer of sponge rubber 27 between the laminations of the wrapping. At the point where the sheet of cell-tight rubber ends and where ordinarily the overlap would produce an irregularity, we insert a strip of sponge rubber 26. We also employ a thin layer of sponge rubber 27 above the cell-tight rubber. Sponge rubber has the property of expanding if space permits and not expanding if space is denied it. This is because it does not possess closed cells which make positive expansion under heat imperative.

The gas expanded rubber used in making this boat fender is manufactured as follows:

| Composition: | Parts by weight |
| --- | --- |
| Rubber, etc. | 100 |
| Sulphur | 3 to 6 |
| Mercaptobenzothiazole | 0.125 |
| Diphenylguanidine | 0.625 |
| Zinc oxide | 5.000 |
| Light calcined magnesia | 6.000 |
| Paraffin wax | 3.000 |
| Whiting | 20.000 | and the composition for the plain ungassed sheathing rubber compound is as follows:

| Composition: | Parts by weight |
| --- | --- |
| Smoked sheet rubber | 100.0 |
| Sulphur | 2.5 |
| Mercaptobenzothiazole | .75 |
| Zinc oxide | 30.00 |
| Stearic acid | 1.00 |
| Red oxide | 20.00 |
| Agerite powder (phenyl-beta-naphthylamine) | 1.00 |
| Paraffin wax | 2.00 |

Both stocks are mixed and calendered in a manner well known to the art, the respective ingredients being thoroughly and uniformly incorporated in the rubber.

In order to produce gas expanded cell-tight rubber from the first mix, the aged calendered sheet stock is loaded in a high pressure autoclave; then a vacuum is effected, removing substantially all air present, after which a gas pressure of about 3,000 pounds per square inch of nitrogen or any suitable inert gas is established. The rubber sheets are subjected to a suitable plasticizing temperature and may or may not be partially vulcanized before the gas pressure is released, or before the sheets have expanded. However, in either procedure the sheets are partially vulcanized before removing from the autoclave in order to retain the gas in the cells.

The partially vulcanized sheet containing the small cells of entrapped nitrogen or similar gas is then wrapped around looped rope to form a sausage-shaped unit and about this core of rope and gas-containing rubber is wrapped a sheath of ordinary unvulcanized rubber. The so-assembled unit is then placed in the mold 15 and subjected to a vulcanizing heat on the order of 287° F. for about 60 minutes. This heat causes the enclosed gas cells within the gassed sheet of partially vulcanized rubber to expand due to the natural physical action of gas under heat, and the expanding gas trapped in the gassed rubber causes an extreme expansion of the rubber of the inner core. This expansion firmly adheres the expanding rubnary rubber due to the tremendous pressure generated in the expanded rubber. The heat at the same time vulcanizes both the gassed and the ungassed rubber, giving a final cure thereto. The mold is then cooled and the unit removed. A firmly bonded composite of rope, gassed rubber and plain rubber as shown in Figure 1 is thereby obtained.

The method of making the alternative boat fenders of our invention will now be set forth. The rubber mix is made in the manner indicated above and is then tubed to obtain the rubber in proper shape. This raw tubed rubber is then cut and weighed, the proper amount being measured out for a certain size boat fender, different sized fenders requiring different amounts of rubber. The rubber is then sewed up in the canvas tube 7, filling only a small portion of the space therein. The closed canvas tube 7 is then placed in a gassing chamber and gassed under pressure. After the assembly has been thoroughly gassed it is taken out of the gassing chamber, placed in a vulcanizing unit, as for instance, a hot air oven. Therein it is subjected to heat which expands the gassed rubber, the heat expanding the gas, which expanding rubber then completely fills the canvas tube 7. It can be seen that in this process the canvas tube 7 acts as a mold to confine and shape properly the expanded rubber 5.

There are many variations of this particular process of gassing and expanding the rubber. The above described process is only the representative manner of carrying out our invention.

Certain specific refinements have been made in producing the boat fender of Figure 1.

We have found difficulty when assembling and wrapping the closed cell rubber sheet around the rope in avoiding a lump where the sheet finally ends. To avoid irregularities in the circular contour of the finished boat fender we proceed as shown in Figure 7 to insert a strip of sponge rubber 26 at this end point of the closed cell rubber strip. This sponge rubber under the action of heat expands to completely fill the declivity and eliminates any gap in the surface. We also employ a layer of sponge rubber intermediate with other layers of gassed rubber and around the external periphery of the finished wrapping of closed cell rubber. Over this is placed the sheet of ordinary unvulcanized rubber which is later hardened to a protective coating. The sponge rubber used in this way expands under the action of heat to take up all the room that the gassed rubber does not take up. Thus, any deficiency in material can be compensated for and a uniform article obtained. The sponge rubber is of special utility in this connection because of its power to expand only where a space permits and not with the great force that a closed cell rubber would expand. The sponge rubber expands by reason of the blowing agents incorporated therein. Such blowing agents are, for example, sodium bicarbonate, or any chemical adapted to evolve a gas. The combination of the closed cell rubber, the sponge rubber with the blowing agents therein, and the ordinary rubber produces a uniform product, and has very desirable results.

Attention is especially directed to the fact that the rubber mix can be impregnated with gas either by external application as indicated above or by the incorporation of a chemical or chemicals adapted to decompose or react to evolve a gas. The condition of plasticity and fiber strength of the rubber must be carefully controlled in any event, so that a closed cell structure is obtained in the mass.

The gas enclosed in the sealed cells in the rubber gives a great resiliency to the unit since the boat fender thus has a rubber core with an infinite number of small elastic cells containing gas sealed in a spherical film of rubber which may be compressed under a force but which instantly revert to their spherical shape when such force is released. The primary purpose, therefore, of resiliency in the boat fender is perfectly accomplished by the expanded rubber fender of our invention. It is to be noted that the resiliency of a fender made in this way is far greater than the resiliency of a plain rubber fender because of these elastic small gas-filled sealed cells contained therein.

The sealed cell rubber structure of our invention is perfectly water-proof. There are no inter-communicating channels into which the water can physically enter and the rubber is, by its nature, repellent to the absorption of water. Therefore, there is no possibility of rot even though it be constantly subjected to the action of water and there is no possibility of any increased weight by reason of absorption of water. This is in marked contrast to many other boat fenders in which absorbent materials are enclosed in canvas sacks. There the absorbed water both materially increases the weight of the boat fender and decreases the life of the boat fender because of damp rot.

When the modified method of making our boat fender is employed in which sponge rubber is used for the purposes set out hereinbefore, there is a certain portion of the boat fender which will take up water since sponge rubber is open celled and water absorptive. The amount of water which can be taken up by the small amount of sponge rubber used in our modified novel boat fender is little in any event and in no way detrimentally affects the desirable properties of our boat fender set forth herein. In fact the small amount of water taken up is useful in causing the boat fender to position itself vertically just below the surface of the water thus preventing it from floating on top of the water out of its normal and useful position.

The sheath of plain rubber around the outside of the expanded rubber dough affords a tough and wear-resistant cover. Full advantage is thus taken of both the nature of the ordinary rubber and the expanded rubber with their respective valuable properties. That is, the lightness, resiliency, and the water-proofness of the gas expanded rubber is combined in permanent relationship without possibility of separation to the tough and wear-resistant sheath of an ungassed rubber compound.

It is to be noted that because of the peculiar expansion of the internal core of gassed rubber during the manufacture of the unit, the rope or other fastening means is secured in permanent engagement without possibility of working loose. The rope, of course, can be used at one or both ends or a single piece of rope can be looped at both ends and the gassed rubber wrapped thereabout.

It is also to be noted that this boat fender is completely immune to the attack of vermin or rats.

Summarizing, the gas expanded closed cell boat fender produced from a rubber composition by the above described methods has a unique combination of properties, particularly desirable in such an article, i. e., great resilience, water-proofness, floatability and resistance to rot.

Obviously, the composition can be varied within wide ranges and different materials employed. Fundamentally our invention resides in the expanded closed cell water resistant and resilient structure. Rubber substitutes or other plastic materials could be used when manufactured according to the indicated process.

We claim:

1. A boat fender comprising a sheet of gas expanded rubber having a multiplicity of minute closed cells containing an inert gas distributed throughout its mass, said sheet of gas expanded rubber being rolled about itself, and a sheath of ordinary rubber secured over and enclosing said sheet of gas expanded rubber.

2. A boat fender comprising a sheet of gas expanded rubber having a multiplicity of minute closed cells containing an inert gas distributed throughout its mass, said sheet of gas expanded rubber being rolled about itself, and a sheath of ordinary rubber secured over and enclosing said sheet of gas expanded rubber, said sheet of gas expanded rubber having been expanded and vulcanized in contact with said sheath of ordinary rubber to form a permanent bond therewith.

3. A boat fender comprising a core of gas expanded rubber having a multiplicity of minute closed cells containing an inert gas distributed throughout its mass, an external sheath of ordinary rubber, and an intermediate layer of gas expanded rubber having a multiplicity of minute open cells distributed throughout its mass positioned between said core and said external sheath.

4. A boat fender comprising a sheet of gas expanded rubber having a multiplicity of minute closed cells containing an inert gas distributed throughout its mass, said sheet of gas expanded rubber being rolled about itself, a sheath of ordinary rubber secured over and enclosing said sheet of gas expanded rubber, and an intermediate layer of gas expanded rubber having a multiplicity of minute open cells distributed throughout its mass positioned between said sheet of gas expanded rubber and said external sheath.

DUDLEY ROBERTS.
LESTER COOPER.
ROGER CHARLES BASCOM.